United States Patent [19]

Kelleher

[11] Patent Number: 5,794,016
[45] Date of Patent: Aug. 11, 1998

[54] PARALLEL-PROCESSOR GRAPHICS ARCHITECTURE

[75] Inventor: Brian Michael Kelleher, Palo Alto, Calif.

[73] Assignee: Dynamic Pictures, Inc., Palo Alto, Calif.

[21] Appl. No.: 570,088

[22] Filed: Dec. 11, 1995

[51] Int. Cl.[6] .................................................. G06F 15/80
[52] U.S. Cl. ................. 395/505; 395/509; 395/497.04; 395/412
[58] Field of Search ..................... 395/502, 505, 395/506, 507, 509, 401, 402, 497.01–497.04, 412–419, 515, 516; 382/303, 304

[56] References Cited

U.S. PATENT DOCUMENTS

| | | | |
|---|---|---|---|
| 4,761,736 | 8/1988 | Di Orio | 395/402 |
| 4,949,280 | 8/1990 | Littlefield | 395/505 |
| 5,117,468 | 5/1992 | Hino et al. | 382/304 |
| 5,276,798 | 1/1994 | Peaslee et al. | 395/505 |
| 5,315,699 | 5/1994 | Imai et al. | 395/505 |
| 5,377,320 | 12/1994 | Abi-Ezzi et al. | 395/502 |
| 5,388,206 | 2/1995 | Poulton et al. | 395/505 |
| 5,392,393 | 2/1995 | Deering et al. | 395/505 |
| 5,408,606 | 4/1995 | Eckart | 395/502 |
| 5,434,967 | 7/1995 | Tannenbaum et al. | 395/506 |
| 5,440,682 | 8/1995 | Deering | 395/503 |
| 5,493,643 | 2/1996 | Soderberg et al. | 395/505 |

OTHER PUBLICATIONS

"Simulation and Expected Performance Analysis of Multiple Processor Z–Buffer Systems", Frederick I. Parke, Computer Graphics, vol. 14, No. 3, pp. 46–56 (Jul., 1980).

"High–Performance Polygon Rendering", Kurt Akeley, Tom Jermoluk, Silicon Graphics, Inc., pp. 6–12, (1988).

Primary Examiner—Kee M. Tung
Attorney, Agent, or Firm—Sawyer & Associates

[57] ABSTRACT

A parallel-processor graphics architecture appropriate for multimedia graphics workstations that is scalable to the needs of a user. The graphics architecture includes one or more rendering processors and a graphics memory that is partitioned into blocks. Noncontiguous groups of the blocks are then assigned to different processors. The parallel-processor graphics architecture is scalable by the number of rendering processors utilized, and is configurable with respect to the allocation of the groups of the blocks to specific rendering processors.

10 Claims, 8 Drawing Sheets

FIG. 12

PARALLEL-PROCESSOR GRAPHICS ARCHITECTURE

FIELD OF THE INVENTION

The present invention relates to computer graphics and more particularly to a parallel-processor graphics architecture appropriate for multimedia graphics workstations that is scalable to the needs of a user.

BACKGROUND OF THE INVENTION

The tasks of traditional geometric graphics applications can be partitioned into three functional categories: structure traversal, geometry processing, and rendering. Structure traversal refers to the traversal of an application's graphics data structure, either by the application or by a graphics library.

Geometry processing refers to floating point intensive operations, such as vertex transformation and shading, that convert the image data from an application's format into a geometric format of vertices comprising the image and vertex properties, such as color. Finally, rendering refers to the process of calculating individual pixel values for the image that are stored in graphics memory based on the transformed geometric data.

Designers have recognized that substantial gains in graphics system performance are possible through the use of multiple processors operating in parallel. One problem with multi-processor graphic subsystem designs is determining how to distribute the rendering tasks among the processors. Prior methods have divided graphics memory or display screen into partitions and allocated different parts of the memory or screen to separate processors. However, those methods are inefficient. In some methods, the processors worked on rendering different parts of the same object and the processors were therefore dependent on one another. If one processor became overloaded and slowed down, it caused the other processors also to slow down.

In other methods, the processors were assigned to large contiguous areas of memory. For instance, in a four processors system, the display screen would be divided into four large adjacent blocks with each processor assigned to a different block. The problem with this method is that it reduces the efficiency of the parallelism of the graphics system. If there were no objects for a processor to render in its area, then the processor sat idle and under utilized, while the other processors may have been overloaded. An extreme solution to this problem would be to assign one processor to one pixel, but as more and more processors are added, additional gains in performance decrease, while costs increase dramatically.

Typical graphic systems include a general-purpose base system with its own central processing unit and main memory, and special-purpose graphics hardware to accelerate the graphics applications. Since the introduction of the first special-purpose graphics hardware, physical memory restrictions have burdened low-level graphics software and firmware developers. To solve this problem, some graphics software interfaces provide a virtual memory abstraction to their applications to allow the application a view of an unlimited number of coexistent images it can create and maintain through the software interface.

Early examples of graphics virtual memory systems include a simple memory-mapped frame-buffer method and a rendering processor method. The memory-mapped frame-buffer method achieved virtual memory rendering by allowing the CPU to implement the rendering algorithms using a virtual memory system in the base system as the graphic memory system. Similarly, the rendering processor method also used the main memory of the base system, but interfaced the main memory with a special-purpose rendering processor through a wide bus. While these systems have very different implementations, they are similar in their ability to render directly into processor virtual memory.

Each of these methods tightly integrates the graphics with the main memory of the base system. Unfortunately, graphic systems marketed today do not satisfy the requirements of a full range of customers. For example, a workstation that uses the CPU to perform rendering operations may be an acceptable low-cost solution; however, some customers will undoubtedly demand higher performance. Similarly, a workstation that utilizes multiple processors to increase system performance may not be scalable downward to please cost-sensitive customers.

Therefore, what is needed is a graphics system architecture that includes a low-cost entry configuration with limited graphics hardware, and allows a higher performance multi-processor configuration in which processor efficiency is maximized. The present invention addresses such a need.

SUMMARY OF THE INVENTION

The present invention provides a parallel graphics system and method for rendering an image on a display screen. The system includes a plurality of processors for rendering an image on the display screen, and a memory organized into noncontiguous groups of blocks. The system and method further comprises block enable means for allocating at least one of the noncontiguous groups of blocks to each of the plurality of processors for rendering, thereby increasing the efficiency of the parallelism of the graphics system.

According to the system and method disclosed herein, the present invention is scalable by the number of rendering processors utilized, and is configurable with respect to the allocation of the groups of the blocks to specific rendering processors.

DESCRIPTION OF THE INVENTION

The present invention relates to an improved parallel-processor graphics architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
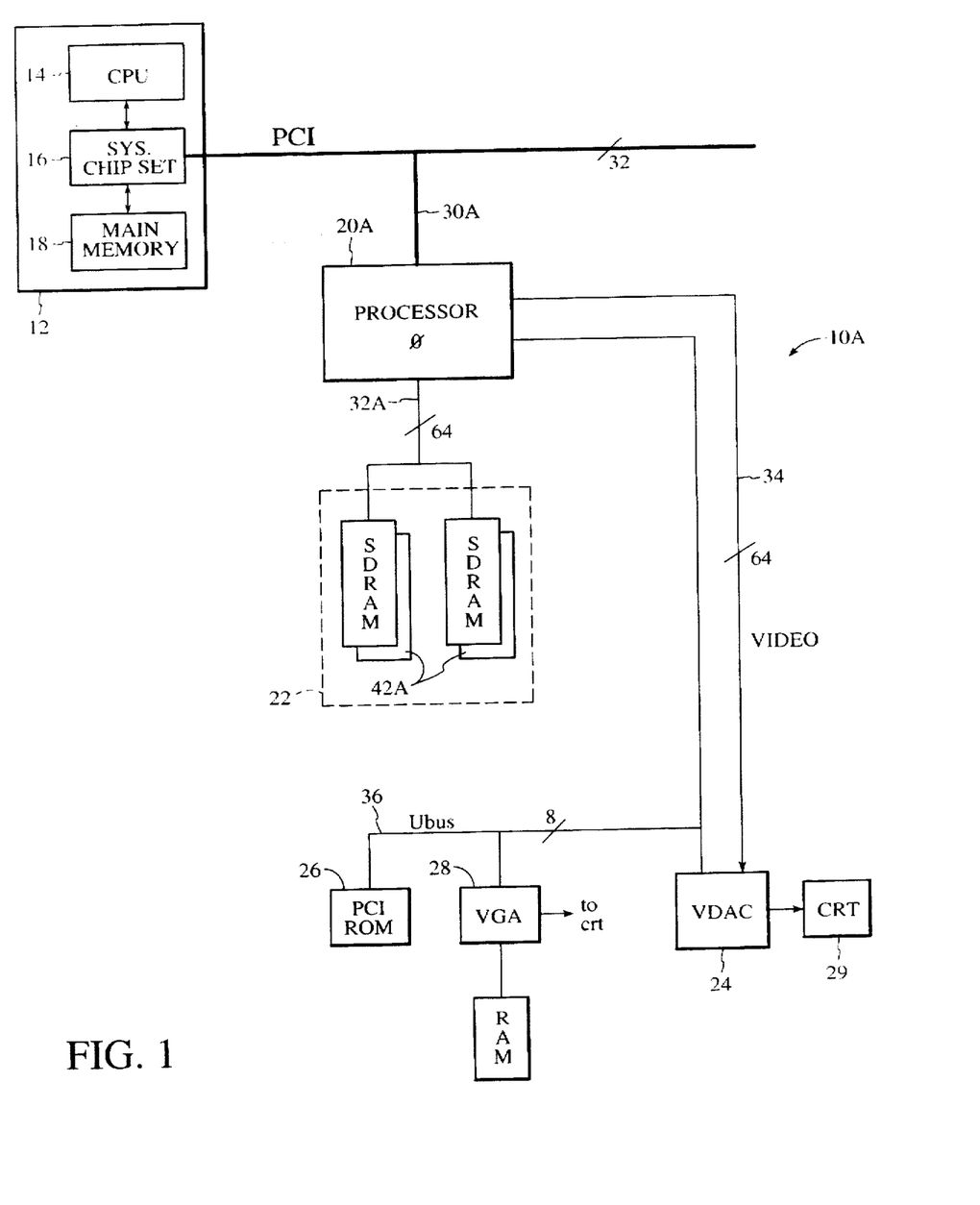
FIG. 1 depicts a low cost implementation of a graphics system having one rendering processor.
Figure 2:
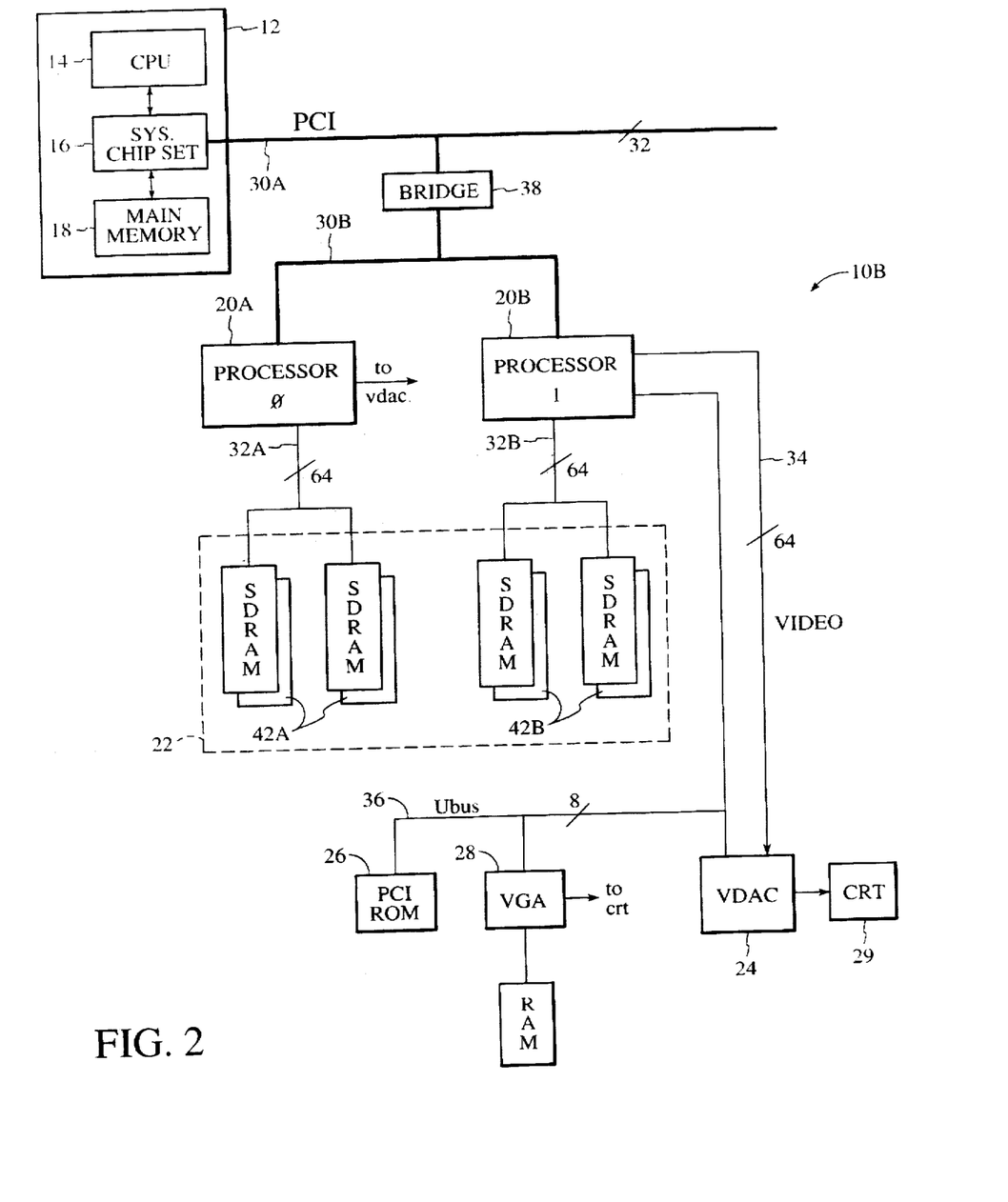
FIG. 2 is a block diagram depicting the graphics system with two rendering processors.
Figure 3:
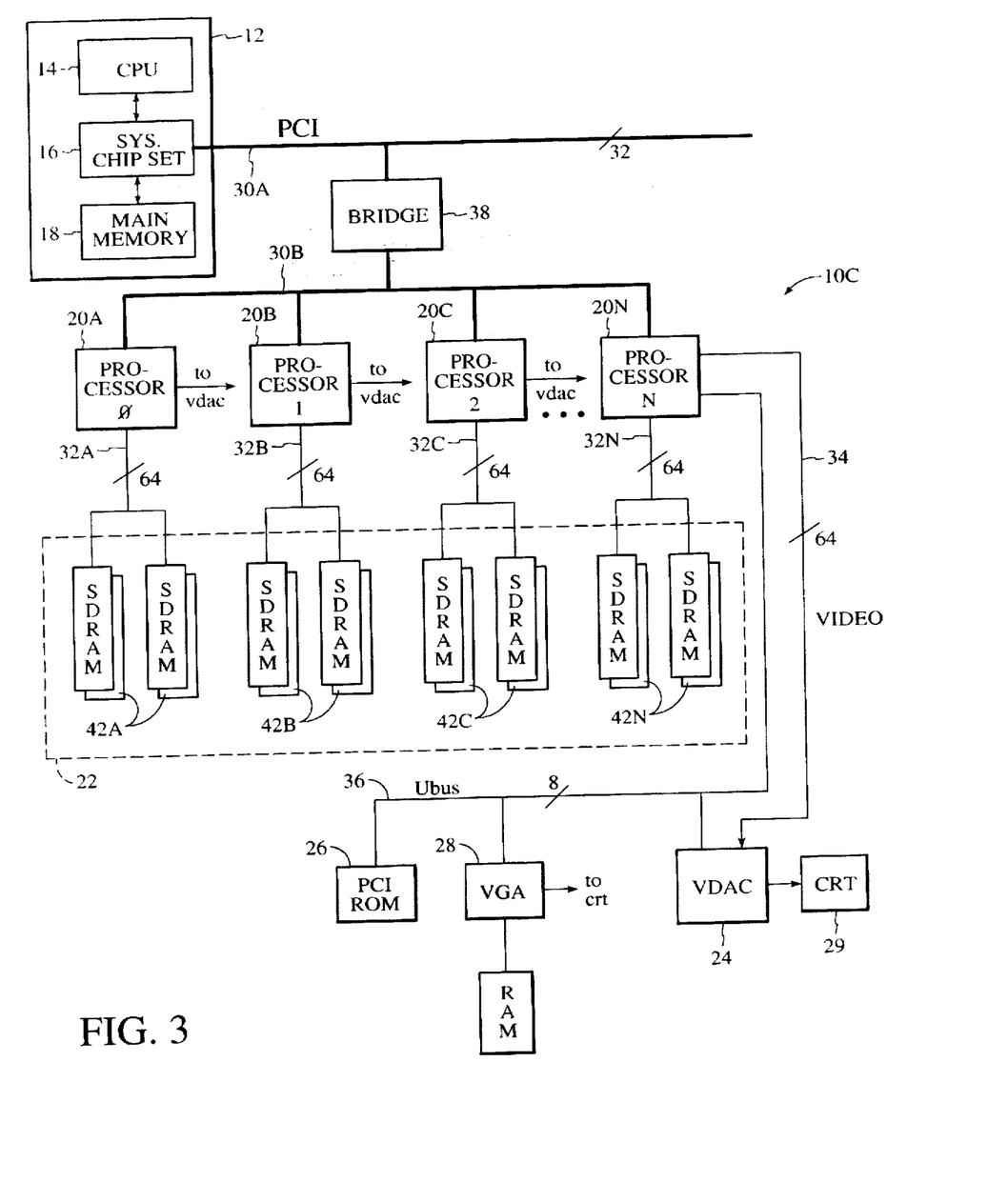
FIG. 3 depicts a high-end implementation of the graphics system with N rendering processors.

FIGS. 1–3 are block diagrams depicting a parallel-processor graphics system 10 of the present invention that is scalable to the needs of a user. The system may be configured with one rendering processor, or with multiple rendering processors. FIG. 1 depicts a low-cost implementation of the graphics system 10A having one rendering processor 20A. FIG. 2 is a block diagram depicting the graphics system 10B with two rendering processors 20A and 20B. FIG. 3 depicts a high-end implementation of the graphics system 10C with N rendering processors 20A–20N. In the multiple-processor configurations, the efficiency of the multiple processors is maximized by effectively distributing the rendering tasks, explained further below.

The graphics system 10A, 10B, and 10C (hereinafter referred to as graphics system 10) is part of a general-purpose base computer system 12 including a CPU 14, a system chip set 16, and main memory 18. Each rendering processor 20A–20N (hereinafter referred to as rendering processor 20) in the graphics system 10 may be coupled to a graphics memory 22, a video digital-to-analog converter (VDAC) 24, a peripheral component interconnect (PCI) ROM 26, and a VGA processor 28.

The purpose of the rendering processor 20 is to accept a geometric description of an object and scan-convert the object into the graphics memory 22. The graphics memory 22, also known as a frame buffer, stores pixel data at memory addresses corresponding to pixels on a display device, such as a cathode ray tube (CRT) 29. The interconnect of the rendering processor 20 comprises four major buses: a PCI bus 30, a memory bus 32, a video bus 34, and a utility bus (Ubus) 36.

The PCI bus 30 is a 32-bit bus that connects the rendering processor 20 to the general-purpose computer system 12. In the multiple-processor configurations 10B and 10C, the rendering processors 20 are connected to a system PCI bus 30A through a PCI bridge 38. Since only one load may be placed on the system PCI bus 30A, the PCI bridge 38 is used to translate the system PCI bus 30A into a second PCI bus 30B.

The video bus 34 provides pixel data from the rendering processors 20 to the VDAC 24 via a 64-bit interconnect. The VDAC 24 is a display interface that receives ordered pixel data from each of the rendering processors 20 in the form of digital color data, and passes the data to a CRT 29.

The Ubus 36 provides an input/output data path for the rendering processor's 20 ancillary chips, such as the VDAC 24, the VGA processor 28 and the PCI ROM 26. The VGA processor 28 is provided so that the graphics system 10 is compatible with legacy systems.

The rendering processor 20 is the primary component of the graphics system 10 of the present invention. The rendering processor 20 implements graphics and multimedia algorithms and interfaces with the PCI bus 30 and all other components in the system 10. The rendering processor 20 integrates video technologies including 2D and 3D geometric graphics, photorealistic rendering, stereoscopic viewing, windowing operations, and live video.

More particularly, each rendering processor 20 implements a set of parallel rendering algorithms including smooth shadowing, depth-buffering, dithering, antialiasing, transparency, blending, alpha testing, stenciling, stippling, accumulation buffering, and texture mapping. In addition, the rendering processor 20 provides a video pipeline for multimedia applications through which live video data can be scaled, filtered, and converted into red, green, and blue color components for storage in graphics memory 22 and subsequent display.

Referring to FIGS. 2 and 3, in order to increase the efficiency of the rendering processors 20, the graphics memory subsystem 22 is partitioned into physical memory segments 42 and each memory segment 42 is coupled to a different rendering processor 20. Each rendering processor 20 accesses only its memory segment 42 of the graphics memory 22 and is required to write only those pixels falling within that memory segment 42. For example, rendering processor 20B is coupled to memory segment 42B and writes only to those pixels contained within memory segment 42B of the graphics memory subsystem 22.

The memory bus 32 connects each rendering processor 20 to its corresponding graphics memory segment 42 via a 64-bit interconnect. In a preferred embodiment of the present invention, the memory segments 42 comprise synchronous dynamic random access memory (SDRAM). In the low-cost one-processor configuration of FIG. 1, four 1M×16 SDRAMs are used to construct an eight Mbyte graphics memory system 22. In the two-processor configuration of FIG. 2, eight 1M×16 SDRAMs are used to construct a sixteen Mbyte graphics memory system 22. In a higher-end four-processor configuration, sixteen 1M×16 SDRAMs are used to construct a thirty-two Mbyte graphics memory system 22. The graphics memory 22 could also be implemented using VRAM, in which case, the graphics memory 22 would connect directly to the VDAC 24.

Prior methods have divided graphics memory or display screen into partitions and allocated different parts of the memory or screen to separate processors. However, those methods are inefficient in the manner that the memory is allocated to the processors, which also creates dependencies among the processors.

The present invention provides an improved method and system for allocating different parts of the graphics memory 22 to multiple rendering processors 20. The method and system for allocating the graphics memory 22 increases the efficiency of the graphics system, and is configurable such that additional rendering processors 20 may be added to the graphic architecture, making the system scalable.

Figure 4:
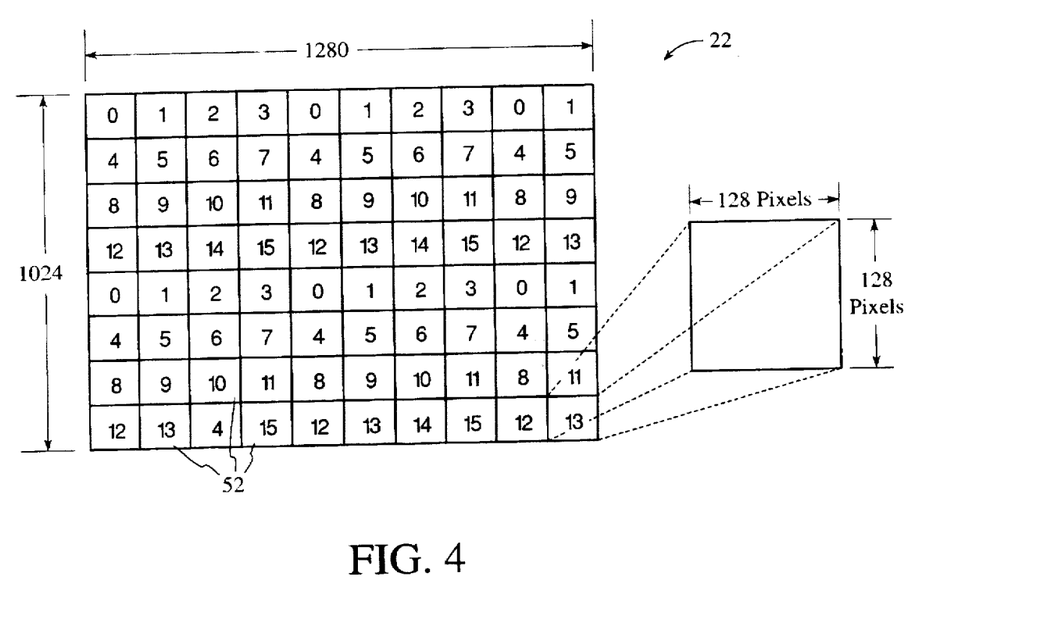
FIG. 4 is a block diagram depicting a graphics memory that has been divided into a plurality of blocks.

To more particularly illustrate the method and system for allocating graphics memory 22 to the rendering processors 20 in accordance with the present invention, refer now to FIG. 4 depicting a block diagram of one embodiment of such a system.

FIG. 4 is a block diagram of a graphics memory 22 that has been partitioned into a plurality of pixel blocks 52 that are tiled in the x- and y-direction of the graphics memory 22. In a preferred embodiment, the graphics memory 22 is large enough to render a 1280×1024 screen display.

According to the present invention, the pixel blocks 52 are organized into noncontiguous groups of blocks 52, where blocks 52 in the same group are designated by the same number. As an example, the graphics memory 22 in FIG. 4 is shown comprising sixteen groups of pixel blocks (0–15). The blocks 52 labeled "0" belong in group "0", the blocks labeled "1" belong in group "1", the blocks labeled "3" belong in group "3" et cetera.

The groups of blocks 52 in the graphics memory 22 are then assigned to the rendering processors 20 for rendering. Each rendering processor 20 writes to only those pixels that are located in the blocks 52 of the assigned groups. The groups of block 52 may be assigned to the rendering processors 20 in varying ratios. Assuming there are sixteen rendering processors present in the multi-processor system 10C, then the sixteen groups of blocks 52 could be assigned to the processors 20 on a one-to-one basis. In this case, the blocks in group "0" may be assigned to rendering processor 0; the blocks in group "1" may be assigned to rendering processor 1; the blocks in group "2" may be assigned to rendering processor 2, and so on.

Figure 5:
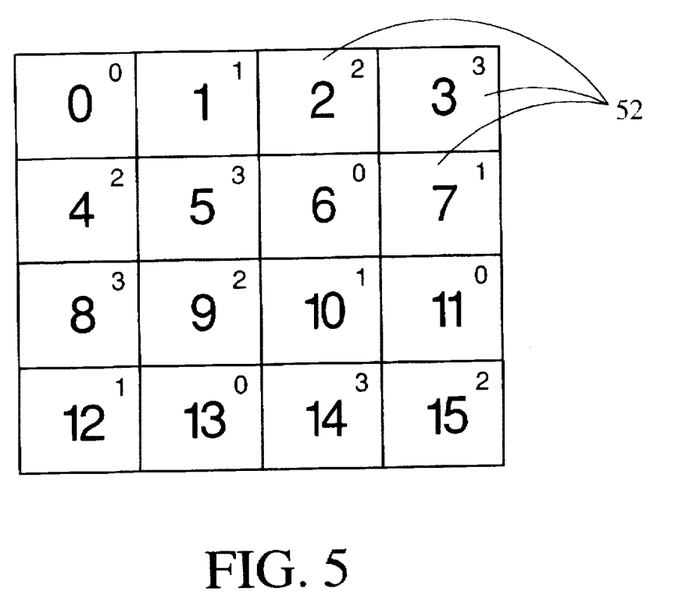
FIGS. 5 and 6 are block diagrams depicting the noncontiguous block organization of the present invention within a 4×4 array of adjacent blocks.
Figure 6:
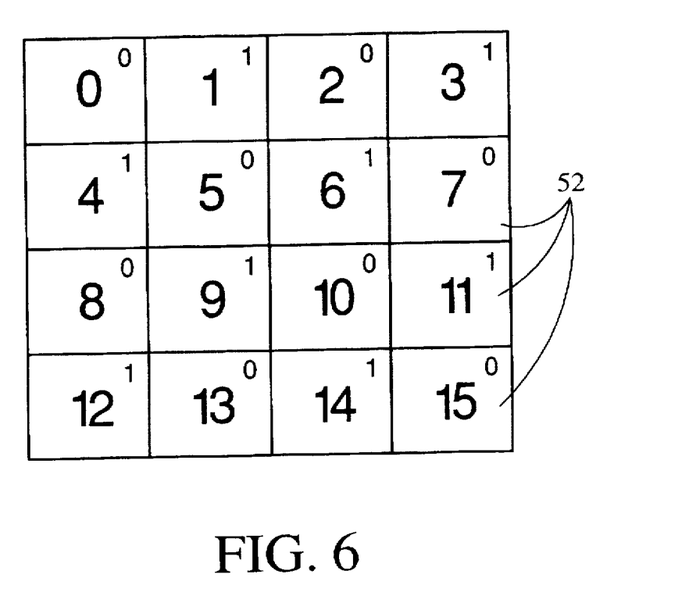

FIGS. 5 and 6 are block diagrams depicting the noncontiguous block organization of the present invention within one 4×4 array of adjacent blocks 52 in the graphics memory 22 (the 4×4 array is replicated throughout the graphics memory 22). The sixteen groups of pixel blocks 52 within each 4×4 array are tiled as in FIG. 4, where a particular group is designated by the middle number in the blocks 52, and the number in the upper right corner of the blocks 52 represents the processor to which a particular block is assigned.

When the number of rendering processors 20 is less than the number of groups of blocks 52, then the groups of blocks 52 may be assigned to the rendering processors 20 in higher ratios, such as two-to-one or four-to-one, rather than the one-to-one ratio above.

Referring to FIG. 5, what is shown is an example allocation of groups of blocks 52 when four rendering processors 20 (0–3) are present. When sixteen groups are allocated among four rendering processors 20, the group of blocks 52 are assigned to the rendering processors 20 in a four-to-one ratio. As shown, processor 0 is assigned to groups 0, 6, 11, and 13; processor 1 is assigned to groups 1, 7, 10, and 12; processor 2 is assigned to groups 2, 4, 9, and 15; and processor 3 is assigned to groups 3, 5, 8, and 14.

Referring to FIG. 6, what is shown is an example allocation of groups of blocks 52 when two rendering processors 20 (0–1) are present. When sixteen groups are allocated among two rendering processors 20, the group of blocks 52 are assigned to the rendering processors 20 in an eight-to-one ratio. As shown, processor 0 is assigned to groups 0, 2, 5, 7, 8, 10, 13, and 15; and processor 1 is assigned to groups 1, 3, 4, 6, 9, 11, 12, and 14.

The assignment or mapping of various groups of blocks 52 to rendering processors 20 is referred to as a processor map. As shown in the processor maps of FIGS. 4–6, the blocks 52 within a particular group that are assigned to a particular processor 20 are arranged in a noncontiguous organization, and are spaced about the display. Therefore, the rendering demands placed on each of the rendering processors 20 should be equalized. That is, as the rendering processors 20 operate in parallel no rendering processor should be idle while others are overloaded. Therefore, the noncontiguous block organization of the present invention effectively increases the overall efficiency and performance of the graphics system 10.

When a polygon to be rendered crosses a block boundary and enters into another block 52, the two rendering processors 20 assigned to each of the respective group of blocks 52 must duplicate calculations for the same polygon, which wastes parallelism. Therefore, in a preferred embodiment of the present invention, each pixel block 52 is 128×128 pixels in size. This block size has been determined to effectively divide the parallelism of the rendering processors 20. Since polygons tend to be particularly small, and 128×128 blocks 52 are relatively large, polygons will not commonly cross block boundaries. The block size, however, is not so large as to slow the rendering processors 20 down when intensive rendering is required in a block 52. As stated above, when the blocks 52 are too large, the distribution of polygons becomes ineffective.

Figure 7:
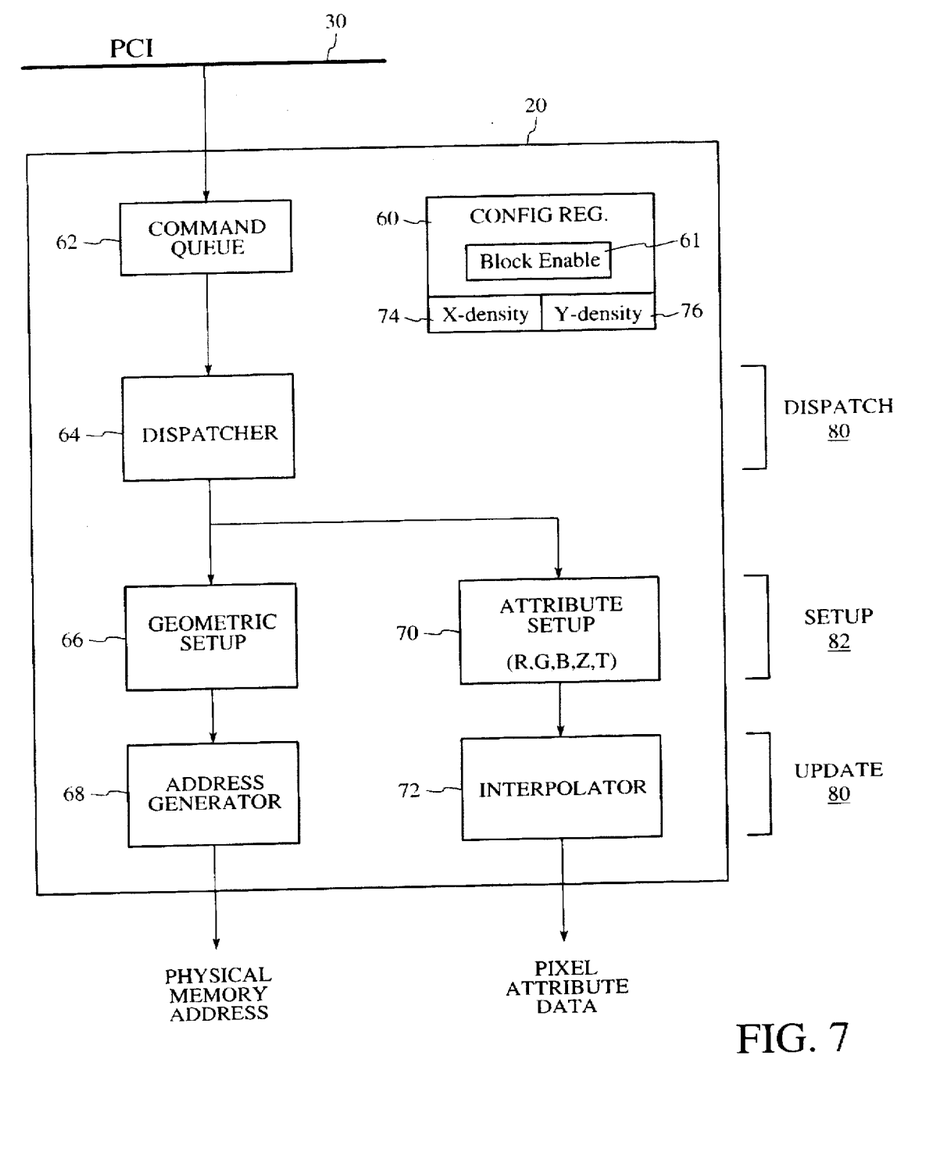
FIG. 7 is a block diagram of a rendering processor.

Referring now to FIG. 7, a block diagram of a rendering processor 20 is shown. Each rendering processor 20 includes a configuration register 60, a command queue 62, a dispatcher circuit 64, a geometric setup circuit 66, an attribute setup circuit 70, an address generation circuit 68 and an interpolator circuit 72.

According to the present invention, the assignment of various blocks to particular rendering processors is not fixed, but is rather alterable through programming. The block assignments are programmed through the configuration register 60, which sets the global state of the rendering processor 20. The configuration register 60 includes a block enable field 61, an X-density field 74 and Y-density field 76.

The block enable field 61 determines which groups of blocks 52 within the graphics memory 22 are allocated to and controlled by the rendering processor 20. It is through the block enable field 61 that the parallelism among the rendering processors 20 may be configured.

The block enable field 61 includes a plurality of bits, where each bit corresponds to a particular group of blocks 52. A set bit implies that a rendering processor 20 accesses the group of blocks 52 corresponding to that bit. For example, if bit zero is set within the block enable field 61 of a particular rendering processor 20, then that rendering processor 20 will access each block 52 in group "0". The bits in the block enable field 61 must be mutually exclusive between rendering processors 20.

In a preferred embodiment, the block enable field 61 is sixteen-bits in length, implying there are sixteen group of blocks 52 that can be distributed among the processors 20. Rather than using a hardware register, the allocation of a group of blocks 52 to a particular processor 20 could also be implemented through software running on each of the rendering processors 20, or through a global register or software located remote from the rendering processors.

Referring again to FIG. 6, for example, the block enable field 61 for the rendering processor 0 would contain the hexadecimal value "a5a5." This means that bits 0, 2, 5, 7, 8, 10, 13 and 15 would be set to instruct the processor to render those groups of blocks 52. The block enable field 61 for rendering processor 1 would contain the complementary hexadecimal value "5a5a." This means that bits 1, 3, 4, 6, 9, 11, 12, and 14 would be set to instruct the processor to render those groups of blocks 52. As in FIG. 4, the noncontiguous block organization shown in FIGS. 5–6 distributes work among the rendering processors 20 in a more efficient manner than prior implementations, thereby improving parallelism.

Referring again to FIGS. 3–7, as stated previously, each rendering processor 20 writes only those pixels that fall within the groups of blocks 52 to which it has been assigned. The pixels within the assigned groups of blocks 52 are rendered in the memory segment 42 connected to that rendering processor 20.

According to the present invention, the use of memory is conserved within the graphics system 10 through the X-density and Y-density fields 74 and 76 in the configuration register 60. The purpose of the X-density and Y-density fields 74 and 76 is to instruct the rendering processor 20 how much of the memory segment 42 to reserve for pixels falling within the assigned groups of blocks 52. Stated another way, the X-density and Y-density fields 74 and 76 instruct the rendering processor 20 not to reserve physical memory for pixels falling within unassigned groups of blocks 52, thus saving memory in each of the memory segments 42.

For an efficient organization of memory in which no memory is wasted, the blocks 52 within each row of blocks 52 must be allocated to the same number of rendering processors 20, and similarly, the blocks 52 within each column of blocks 52 must be allocated to the same number of rendering processors 20. Furthermore, for ease of implementation, the number of processors 20 corresponding to the blocks 52 in each row of blocks 52 and to the blocks 52 in each column of blocks 52 must be a power of two. The following discussion assumes such an organization.

The X-density and Y-density fields 74 and 76 indicate the minimum size of a two-dimensional array of blocks 52 that, at any location within the graphics memory 22 aligned on a block boundary that is a multiple of the values of the X-density and Y-density 74 and 76 in the X and Y dimensions, respectively, include one and only one block allocated to each of the processors 20 in the system. If such a two-dimensional array is unachievable within the configuration's processor map, then the configuration can not achieve optimal memory usage within the scope of the present invention and the processor map should be altered accordingly. With an optimal processor map, the number of blocks 52 in the two-dimensional array determined by X-density and Y-density fields 74 and 76 should equal the number of processors 20 in the system.

Referring again to FIG. 5, what is shown is an example in which the X- and Y-density fields 74 and 76 may be set to two and two, respectively, to four and one respectively, or to one and four, respectively; each of these settings will provide the same results. Referring again to FIG. 6, what is shown is an example in which the X- and Y-density fields 74 and 76 may be set to two and one respectively, or to one and two, respectively; each of these settings will provide the same results.

As stated above, the X- and Y-density fields 74 and 76 instruct the rendering processors 20 not to reserve physical memory for pixels within unassigned blocks 52. A rendering processor 20 uses its X-density and Y-density fields 74 and 76 to create 'aliases' of pixel coordinate addresses to physical memory addresses. Specifically, all blocks 52 within a two-dimensional array of blocks 52 that is X-density by Y-density blocks 52 in size, and is aligned on a block boundary that is a multiple of X- and Y-density in the X and Y dimensions, respectively, share physical memory addresses.

For example, referring to FIG. 5, if the X-density and Y-density fields 74 and 76 are set to two and two, respectively, then the 2×2 array formed from the groups of blocks 0, 1, 4, and 5 will share physical memory addresses; the groups of blocks 2, 3, 6, and 7 will share physical memory addresses; the groups of blocks 8, 9, 12, and 13 will share physical memory addresses; and the groups of blocks 10, 11, 14, and 15 will share physical memory addresses.

Since a rendering processor 20 updates only the memory within the blocks 52 allocated to it by the block enable field, only the aliases corresponding to the allocated blocks 52 will be updated by the rendering processor 20. Referring again to FIG. 5 for example, in the 2×2 array formed from the groups of blocks 0, 1, 4, and 5, only the block in group 0 is allocated to processor 0. Therefore, the aliases corresponding to groups 1, 4, and 5 will not be updated by processor 0. And as a result, the physical memory addresses shared by groups 0, 1, 4, and 5 will contain only the data corresponding to the block in group 0.

Consequently, the physical memory requirements within each rendering processor 20 are reduced by a factor equivalent to the size of the two-dimensional array determined by X-density and Y-density fields 74 and 76, which is also equivalent to the number of rendering processors 20 in a configuration with an optimal processor map.

As with the block enable field 61, the X- and Y-density fields 74 and 76 can be implemented through software or through software or hardware located remote from the rendering processor.

Figure 8:
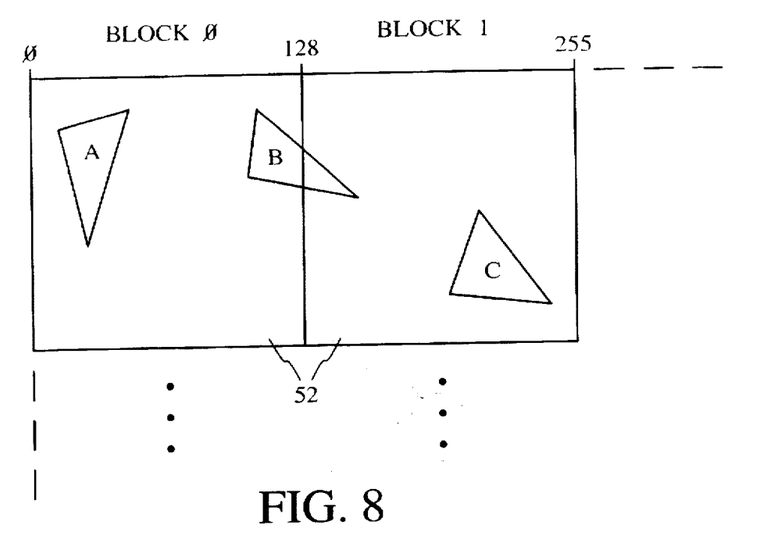
FIG. 8 is a block diagram showing three triangles, triangle A, triangle B, and triangle C that are to be rendered in blocks 0 and 1.

The operation of the parallel graphics architecture of the present invention will be explained by way of example. FIG. 8 is a block diagram showing three triangles, triangle A, triangle B, and triangle C that are to be rendered in a block 52 belonging to group "0" and in a block 52 belonging to group "1". As explained above, through the appropriate assignment of groups of blocks 52 to rendering processors 20 by the block enable fields 61 of the configuration registers 60, all objects appearing in the group "0" blocks (block 0) will be rendered by rendering processor 0, and all objects appearing in the group "1" blocks (block 1) will be rendered by rendering processor 1.

Referring to FIGS. 3 and 8, the triangles originate from a graphics application executing on the CPU 14, which performs all 3D pipeline calculations, such as transformations and shading computations. At the last stage of the 3D graphics pipeline, the CPU 14 generates graphic command packets, which typically include 3D geometry information in the form of (x, y) coordinates and pixel intensity values (Red, Green, Blue) for the vertices comprising each triangle. The CPU 14 is aware of the checkerboard pattern of the graphics memory 22, and from the triangle vertices determines in which blocks 52 the triangles will be visible or partially visible. The CPU 14 sends command packets for triangle A to processor 0, and the command packets for triangle C to processor 1. Since triangle B is visible in both block 0 and block 1, the CPU 14 sends the command packets for triangle B to both processors 0 and 1. However, processors 0 and 1 will render only those pixels of triangle B that are viewable in the block 52 corresponding to the respective rendering processor 20.

Referring again to FIG. 7, in response to graphic commands sent from the CPU 14, each of the rendering processors 20 independently scan-converts the geometric objects into the memory blocks 52 indicated by their block enable field 61. The rendering processor 20 first reads the command packets sent to it over the PCI bus 30 and stores them in the command queue 62.

The rendering processor 20 then processes the command packets in a pipeline process comprising a dispatch stage 80, a setup stage 82, and an update stage 84. In the dispatch stage 80, the dispatcher circuit 64 reads the command packets from the command queue 62 and dispatches the vertex data in the command to the next stage in the pipeline, the setup stage 82.

The setup stage 82 includes the geometric setup circuit 66 and the attribute setup circuit 70, which operate in parallel.

Both the geometric setup circuit 66 and the attribute setup circuit 70 accept the triangle vertex data in the form of (x, y) coordinate data, and setup the triangles for scan-conversion by the update stage 84.

From the triangle vertex data, the geometric setup circuit 66 determines initial geometry values in the form of (x, y) coordinates for the attribute setup circuit 70. Similarly, the attribute setup circuit 70 calculates initial attribute values for the interpolator circuit 72. The attributes include red, green, blue, z (depth), and transparency values.

The update stage 84 includes the address generation circuit 68 and the interpolator circuit 72, which also operate in parallel. The interpolator circuit 72 uses the initial attribute values in order to interpolate final attribute values for the pixels in each triangle. The output of the interpolator circuit 72 is used to update the pixel attributes in memory once the physical address for those pixels are calculated.

The address generation circuit 68 accepts the initial geometry values from the geometric setup circuit 66 and traverses each of the triangles in order to generate physical memory addresses for each of the pixels within each of the triangles.

As stated above, physical memory restrictions have burdened low-level graphics software and firmware developers since the introduction of the first special-purpose graphics hardware. Early examples of graphics virtual memory systems designed to handle the physical memory restrictions tightly integrate the graphics with the main memory 18 of the base system 12. Unfortunately, systems that tightly integrate graphics with the base system 12 include a high-end implementation that may not be scalable downward to a low-cost implementation, and vice versa.

According to the present invention, the graphics memory 22 is a virtual memory system that remains relatively loosely integrated with the main memory 18 of the base system 12, and therefore enables system scalability. The graphics physical memory and virtual memory systems are distinct from those of the base system 12. This allows a user to add graphic boards to the base system 12 that are equipped with a varying number of rendering processors 20. In addition to providing an upgrade path, the present invention allows the graphics subsystem 10 and base system 12 to evolve separately, and allows the graphics subsystem 10 to be portable to different base system architectures.

In the present invention, graphic applications view the graphics memory system 22 as a virtual resource just as they view main memory 18 as a virtual resource. Whereas the CPU 14 presents a higher-level abstraction of main memory 18 in terms of basic data structures, such as bytes and words, the rendering processor 20 presents a higher-level abstraction of the graphics memory 22 in terms of pixels and pixelmaps.

Figure 9:
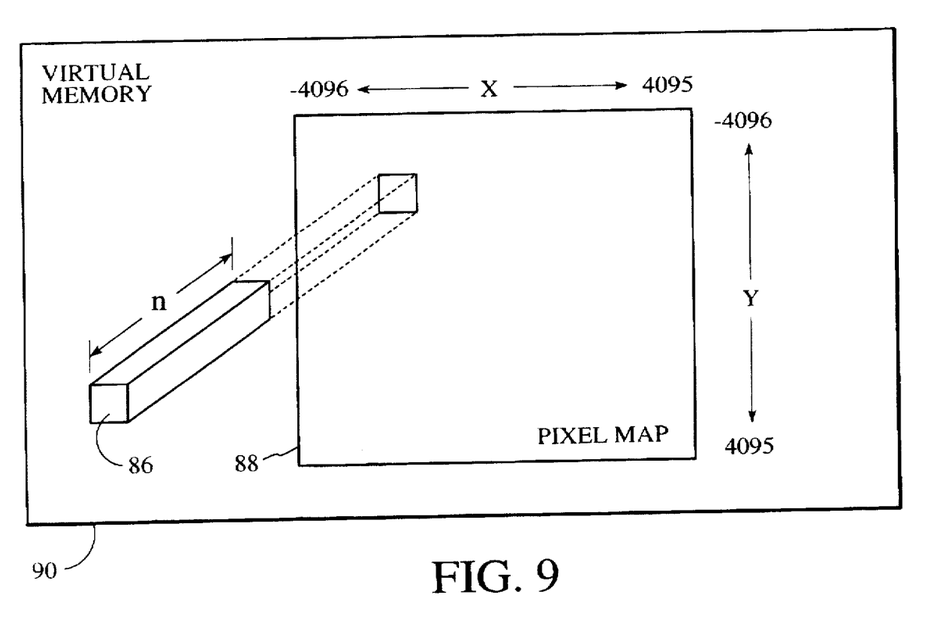
FIG. 9 is a block diagram showing a representative pixel and pixelmap within a graphics virtual memory 90.

Referring now to FIG. 9, a representative pixel 86 and pixelmap 88 are shown within graphics virtual memory 90. A pixel 86 is an N-bit unit of virtual memory 90, where N may represent 8 bits, 16 bits, or 32 bits. A pixelmap 88 is a two-dimensional array of pixels 86, where an (x,y) coordinate pair references a pixel 86 within the pixelmap 88. In a preferred embodiment, a pixelmap's 88 coordinate space ranges from −4096 to 4095 in both x and y, and a pixel 86 is 32 bits in length. A plurality of pixelmaps 88 may exist in virtual memory 90, and some may be visible while others are not. Each pixelmap 88 is identified by a unique pixelmap ID, called a PID.

Figure 10:
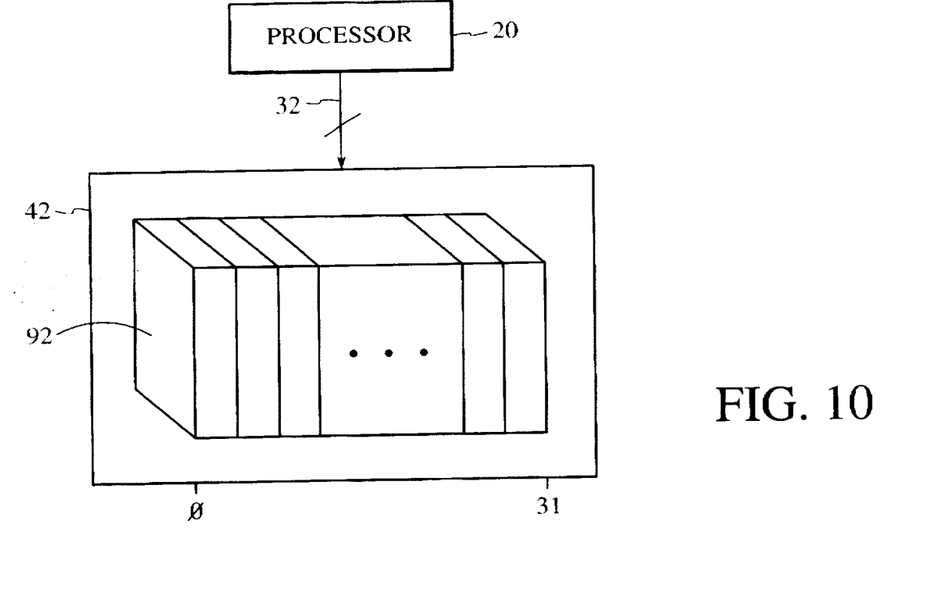
FIG. 10 is a block diagram illustrating a rendering processor and an associated memory segment.

FIG. 10 is a block diagram illustrating a rendering processor 20 and an associated memory segment 42. The virtual memory 90 of the graphics system 10 views a memory segment 42 as an array of page frames 92. When the data of a rendering processor 20 is too large to fit into the physical memory segment 42, the CPU 14 manages the data movement, referred to as paging, between auxiliary storage devices and the memory segment 42. During the paging process when data is moved from auxiliary storage to a physical memory segment 42, enough data is transferred to completely fill a page frame 92.

A page frame 92 refers only to the memory itself, not the data stored in the page frame 92. The data stored in the memory is a page. One page frame 92 of memory stores one page of data. A page frame 92 is identified by a page frame number (PFN). A page is identified by a virtual page number (VPN), typically the higher-order bits of the virtual address.

In a preferred embodiment of the present invention, thirty-two page frames 92 are used to map to one memory segment 42. All pages within the page frames 92 are the same size depending on the size of the memory segment 42. In a preferred embodiment, the page frames 92 are 64 KB when mapping to a 2 MB memory segment 42, 128 KB when mapping to a 4 MB memory segment 42, and 256 KB when mapping to an 8 MB memory segment 42.

Visible pixelmaps 88 have real-time requirements imposed by the CRT 29. The portions of those pixelmaps 88 with real-time requirements must always be resident within a memory segment 42 and therefore must occupy a fixed subset of the page frames 92. The number of page frames 92 occupied by the visible pixelmaps 88 depends on the display resolution and the number of rendering processors 20 sharing the visible pixelmaps 88.

Referring again to FIGS. 7 and 8, recall that the geometric setup circuit 66 passes the vertice coordinates of the triangles to the address generation circuit 68. The function of the address generation circuit 68 is to traverses each triangle, generate virtual addresses for the pixels, and to then translate the virtual addresses into physical memory addresses within the corresponding memory segment 42.

Figure 11:
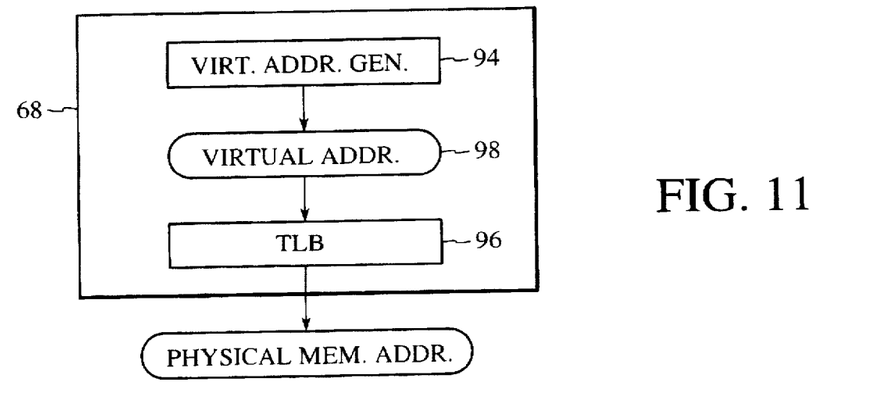
FIG. 11 is a functional block diagram of an address generation circuit.

FIG. 11 is a functional block diagram of the address generation circuit 68. The address generation circuit 68 includes a virtual address generator circuit 94 and a translation lookaside buffer (TLB) 96. The virtual address generator circuit 94 generates a virtual address 98 for each location within a geometric object, such as a triangle. A virtual address 98 includes a pixelmap ID and an (x,y) coordinate pair.

Figure 12:
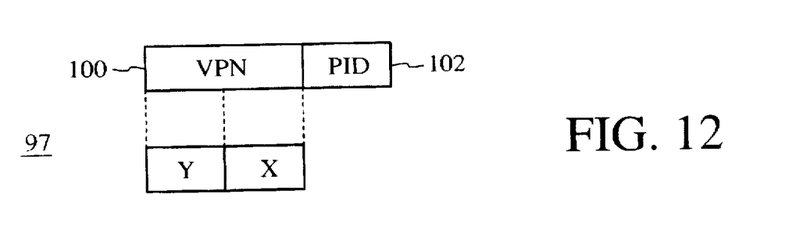
FIG. 12 is a block diagram illustrating the contents of a TLB entry.

Referring to FIGS. 10–12, the TLB 96 in the address generation circuit 68 is a hardware structure that provides a mapping of all page frames 92 resident in the memory segment 42. Given a virtual address 98 provided by the virtual address generator 94, the TLB 96 is used to determine the corresponding page frame number (PFN).

A TLB 96 that provides a mapping of all page frames 92 resident in the memory segment 42 is different from most TLB implementations, which map a relatively small number of page frames 92 and trap to system software when the TLB does not contain the desired mapping. According to the present invention, the rendering processor 20 will trap only when a referenced page is not resident in the memory segment 42. This is known as a page fault.

As stated above, there are thirty-two page frames 92 corresponding to each memory segment 42. Therefore each TLB 96 contains thirty-two entries.

FIG. 12 is a block diagram illustrating the contents of a TLB entry 97. A TLB entry 97 includes a VPN 100 and the PID 102 of the pixelmap ID. The VPN 100 includes the high-order bits of the (x,y) coordinates. The TLB 96 takes the PID and the high-order bits of the (x,y) coordinates in a virtual address 98 and compares them with all thirty-two entries 97 in the TLB 96.

If the referenced VPN 100 is resident inside the memory segment 42, then the TLB 96 returns the corresponding page frame number (0–31). If the referenced VPN 100 is not resident in the memory segment 42 signaling a page fault, then the rendering processor 20 transmits an interrupt to the CPU 14. The CPU 14 responds by paging an old page out of the memory segment 42 and moving the requested data from base system 12 into the graphics memory 22 segment 42. Thus, the graphics virtual memory 90 system is layered on top of the virtual memory of the base system 12, allowing the graphics system 10 to take advantage of existing mechanisms for backing up data to auxiliary storage.

After the TLB 96 returns the relevant PFN, the address generation circuit 68 then determines the actual physical memory address 99 in the memory segment 42 for the (x,y) pixel coordinate.

As stated above, one goal of the address translation process, which in a preferred embodiment includes a virtual memory paradigm, is to avoid wasting memory in each memory segment 42. As a specific example in FIG. 8, the rendering processor 20 assigned to block 0 should not set aside physical memory for pixels 128 to 255 in block 1. In other words, since those pixels belong to the memory segment 42 for block 1, the virtual memory for the pixels should not have a physical counterpart in the memory segment 42 of processor 0. Therefore, processor 0 will generate physical addresses for all the pixels in triangle B, but will only write to those pixels of triangle B that have physical addresses 99 in the memory segment 42 for processor 0.

Referring to FIGS. 7 and 11, after the virtual addresses 98 are translated into physical memory addresses 99 through the TLB 96 mapping process, the block enable field 61 of the rendering processor 20 is checked to determine if the generated physical address 99 is within the bounds of the corresponding memory segment 42. If it is, then the pixel attributes calculated by the interpolator circuit 72 are written into those physical addresses 99 in the memory segment 42; otherwise, the pixel attributes are not written.

In a preferred embodiment, each virtual address generated by the address generator circuit 68 results in the update of eight pixels at once. The update attributes for the eight pixels are stored into a 4×2 array called an update array. Similar to how blocks are tiled in the graphics memory 22, the update arrays are tiled one after the other in each of the blocks 52.

A parallel graphics method and system has been disclosed that is scalable by the number of rendering processors utilized, and is configurable with respect to the allocation of memory blocks to specific rendering processors.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A parallel graphics system including a display screen, the system comprising:

a plurality of processors for rendering an image on the display screen;

a memory organized into noncontiguous groups of blocks;

block enable means for allocating at least one of the noncontiguous groups of blocks to each of the plurality of processors for rendering, the block enable means further comprising:

a block enable field, the block enable field including a bit location corresponding to each one of the noncontiguous groups of blocks, wherein a first group of blocks is allocated to a first processor by setting the bit location corresponding to the first group of blocks; and density means for instructing each of the plurality of rendering processors not to reserve memory for locations within unassigned blocks, thereby conserving the use of memory within the graphics system and increasing the efficiency of the parallelism of the graphics system.

2. A system as in claim 1 wherein the density means includes an X-density field and a Y-density field.

3. A system as in claim 2 wherein each one of the plurality of processors includes a configuration register, and wherein the block enable field, the X-density field, and a Y-density field are included in the configuration register.

4. A system as in claim 3 further including:

a graphics virtual memory having virtual addresses;

address generation means for generating a plurality of the virtual addresses for the image to be rendered on the display screen; and translation means for translating the plurality of the virtual addresses into a plurality of physical memory addresses within the memory.

5. A system as in claim 4 wherein the address generation means and the translation means is included in each one of the plurality of processors.

6. A method for rendering an image on a display screen in a parallel graphics system including physical memory, the method comprising the steps of:

(a) providing a plurality of processors for rendering an image on the display screen, step (a) further comprising the steps of:

(a1) dividing the physical memory into a plurality of physical memory segments; and (a2) assigning one of the plurality of physical memory segments to each of the plurality of processors;

(b) organizing the physical memory into noncontiguous groups of blocks;

(c) allocating at least one of the noncontiguous groups of blocks to each of the plurality of processors for rendering, thereby increasing the efficiency of the parallelism of the graphics system; and (d) providing a density field for instructing each of the plurality of rendering processors not to reserve physical memory for locations within unassigned blocks, thereby conserving the use of memory within the graphics system.

7. A method as in claim 6 further including the steps of:

(e) providing the parallel graphics system with a graphics virtual memory having virtual addresses;

(f) generating a plurality of the virtual addresses for the image to be rendered on a display screen;

(g) translating the plurality of the virtual addresses into a plurality of physical memory addresses in each of the physical memory segments; and (h) rendering the image by writing pixel attribute data in locations in the physical memory segments indicated by the physical memory addresses.

8. A parallel graphics system for rendering an image on a display screen comprising:
- a general-purpose computer system including a central processing unit and a main memory;
- a bus coupled to the central processing unit;
- a graphics memory divided into a plurality of physical memory segments, and organized into noncontiguous groups of blocks;
- a plurality of processors connected to the bus, each one of the plurality of processors coupled to one of the plurality of physical memory segments, each of the processors including:
  - a configuration register including block enable means for allocating at least one of the noncontiguous groups of blocks to the respective processor for rendering, and density means for instructing the respective processor not to reserve physical memory for locations within unassigned blocks; and
  - circuit means for independently scan-converting the image into the physical memory segment that is coupled to the respective processor.

9. A system as in claim 8 wherein the circuit means comprises:
- a command queue for storing graphic commands for the image;
- a geometric setup circuit for determining initial geometry coordinates within the image from the graphic commands;
- an attribute setup circuit for calculating initial attribute values for the image from the graphic commands;
- an interpolator circuit responsive to the initial attribute values for interpolating final attribute values for the image; and
- an address generation circuit responsive to the initial geometry coordinates for generating physical memory addresses in the corresponding physical memory segment.

10. A system as in claim 9 further including a graphics virtual memory that is separate from the general-purpose computer system, the virtual memory having a plurality of virtual addresses, each one of the plurality of physical memory segments including a plurality of virtual page frames identified by a virtual page number.

* * * * *